United States Patent [19]
Oh et al.

[11] Patent Number: 5,787,208
[45] Date of Patent: Jul. 28, 1998

[54] IMAGE ENHANCEMENT METHOD AND APPARATUS

[75] Inventors: Seho Oh, Mukilteo; Shih-Jong J. Lee, Bellevue; Michael J. Seo, Kirkland; Chih-Chau L. Kuan, Redmond; Florence W. Patten, Issaquah, all of Wash.

[73] Assignee: NeoPath, Inc., Redmond, Wash.

[21] Appl. No.: 472,389

[22] Filed: Jun. 7, 1995

[51] Int. Cl.⁶ .................. G06K 9/40; G06K 9/00
[52] U.S. Cl. .................. 382/257; 382/128; 382/133
[58] Field of Search .................. 382/257, 128, 382/133, 155, 283, 100, 190, 260, 279

[56] References Cited

U.S. PATENT DOCUMENTS

| | | | |
|---|---|---|---|
| 3,824,393 | 7/1974 | Brain | 250/222 PC |
| 4,034,342 | 7/1977 | Kruklitis | 340/146.3 |
| 4,175,860 | 11/1979 | Bacus | 356/39 |
| 4,523,278 | 6/1985 | Reinhardt | 382/133 |
| 4,783,751 | 11/1988 | Ehrlich | 382/257 |
| 4,866,785 | 9/1989 | Shibano | 382/8 |
| 4,965,725 | 10/1990 | Rutenberg | 364/413.1 |
| 5,029,226 | 7/1991 | Klein et al. | 382/50 |
| 5,072,382 | 12/1991 | Kamentsky | 364/413.08 |
| 5,172,420 | 12/1992 | Ray et al. | 382/8 |
| 5,201,011 | 4/1993 | Bloomberg | 382/257 |
| 5,202,933 | 4/1993 | Bloomberg | 382/9 |
| 5,257,182 | 10/1993 | Luck et al. | 364/413.1 |
| 5,287,272 | 2/1994 | Rutenberg et al. | 364/413.01 |
| 5,315,700 | 5/1994 | Johnston et al. | 395/163 |
| 5,361,140 | 11/1994 | Hayenga et al. | 358/446 |
| 5,392,137 | 2/1995 | Okubo | 382/260 |
| 5,577,131 | 11/1996 | Oddou | 382/173 |
| 5,579,445 | 11/1996 | Loce | 382/279 |
| 5,586,160 | 12/1996 | Mascio | 378/37 |
| 5,598,481 | 1/1997 | Nishikawa | 382/130 |
| 5,615,314 | 3/1997 | Schoenzeit | 395/114 |
| 5,627,908 | 5/1997 | Lee | 382/133 |
| 5,647,025 | 7/1997 | Frost. | |

OTHER PUBLICATIONS

Zamperoni, "Variations on the Rank–Order Filtering Theme for Grey–Tone and Binary Image Enhancement" IEEE Publication issued 1989, pp. 1401–1404.

Yoda, H. et al., "An Automatic Wafer Inspection System Using Pipeline Image Processing Techniques", IEEE Transaction on Pattern Analysis and Machine Intelligence, vol. 10, No. 1, issued Jan. 1988.

Bacus, James W. and Les J. Grace, "Optical Microscope System For Standardized Cell Measurements and Analyses", *Applied Optics*, 26:16, pp. 3280–3292, 15 Aug. 1987.

Bartels, Peter H., et al., "A Self–Learning Computer Program for Cell Recognition", *ACTA Cytologica: The Journal of Clinical Cytology*, 14:8, pp. 486–494, Oct. 1970.

Tanaka, Noboru, et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright© 1987 by the Optical Society of America and reprinted by permission of the copyright owner.

Duda, Richard O. and Peter E. Hart, "Fisher's Linear Discriminant", *Patent Classification and Scene Analysis*, Copyright ©1973, pp. 114–119.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

(List continued on next page.)

*Primary Examiner*—Jose L. Couso
*Assistant Examiner*—Matthew C. Bella
*Attorney, Agent, or Firm*—Hans I. Sun; Emil Moffa

[57] ABSTRACT

Image enhancement for a digital image, such as an image of a biological specimen mounted on a microscope slide or a cytological specimen is herein described. A digital representation of the image is dilated to produce a dilated image and eroded to provide an eroded image. The dilated image, eroded image and the digital representation of the image are then processed to produce an enhanced image.

27 Claims, 12 Drawing Sheets

OTHER PUBLICATIONS

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimen Adequacy" and Part 2: Descriptive Diagnoses, *The Bethesda System for Reporting Cervical/Vaginal Cytologic Diagnoses*, ©Springer–Verlage; 1994.

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", Proceedings, 9th Annual IEEE Conference on Engineering in Medicine and Biomedical Sciences, Boston, pp. 1560–1561, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

IMAGE ENHANCEMENT METHOD AND APPARATUS

The present invention relates to image processing and, more particularly to enhancement of images using morphological computations, such as dilation and erosion to provide sharp, robust images for an automated microscopy apparatus.

BACKGROUND OF THE INVENTION

Systems for providing image signals typically include an image capturing device, such as, for example, a microscope or camera, positioned to be focused upon an object and constructed for providing image signals representing an image of the object. Typically, such imaging systems also include apparatus for monitoring the image signals and for varying the focus of the camera to provide a focused image signal. However, because image capturing devices, such as microscopes and cameras, are not perfect, acquired images often exhibit significant undesirable blurriness. Blurriness is an imperfection typically caused by an aberration of the lens system and/or defocusing. Such imperfections unfortunately result in unstable or degraded performance for an affected image processing system.

For a known blurring function, a deblurring method may be used to inverse filter resulting blurred images. Such inverse filtering methods may restore the image to an original state substantially perfectly, but if an acquired image is contaminated by unknown noise, then the restoration result may be unstable. Unstable restoration occurs because inverse filtering amplifies noise as well as the acquired image.

Another approach uses a linear estimation method to restore an image to its original state. The linear estimation method yields better stability, but if a ratio of maximum eigen value and minimum eigen value of the blurring function employed is large, then the restored image becomes unstable.

Automated image systems are currently being manufactured and further developed to analyze cytological specimens. Because of the above described problems, inverse filtering and linear estimation methods are inadequate for solving blurring problems in such automated imaging systems. It is, therefore, a motivation of the invention to use a sufficiently high boundary contrast property of images to produce an enhanced image.

It is another motivation of the method of this invention to yield an enhanced image having a very sharp edge. Edge sharpening using conventional techniques suffers from oscillation near an edge because known methods apply inverse low pass filtering. In contrast, the method of the invention does not suffer from any oscillation effect and resulting images are stable, that is, the pixel value of the image never significantly saturates.

SUMMARY OF THE INVENTION

The invention provides an image enhancement method for useful, in one embodiment, for automated microscopy equipment. An image of a portion of a cytological specimen is obtained. A digital representation of the image is produced. The digital representation of the image is dilated to produce a dilated image. The digital representation of the image is eroded to provide an eroded image. The dilated image, eroded image and the digital representation of the image are processed by a combination operation so as to produce an enhanced image.

In an alternate embodiment the invention further comprises the step of preprocessing the digital representation of the image prior to the step of dilating the digital representation of the image with a linear filter, a noise reduction filter, a low pass filter, a moving average, or a median filter.

In a further embodiment the invention provides an image enhancement apparatus. Means for obtaining an image of a portion of the cytological specimen is coupled to means for providing a digital representation of the image. Means, coupled to the image obtaining means, for dilating the digital representation of the image to produce a dilated image is further coupled to means for eroding the digital representation of the image to provide an eroded image. Means for processing the dilated image, eroded image and the digital representation of the image is coupled to the image obtaining means, eroding means and dilating means. The processing means comprises a combination operation means for producing an enhanced image.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

Figure 1A:
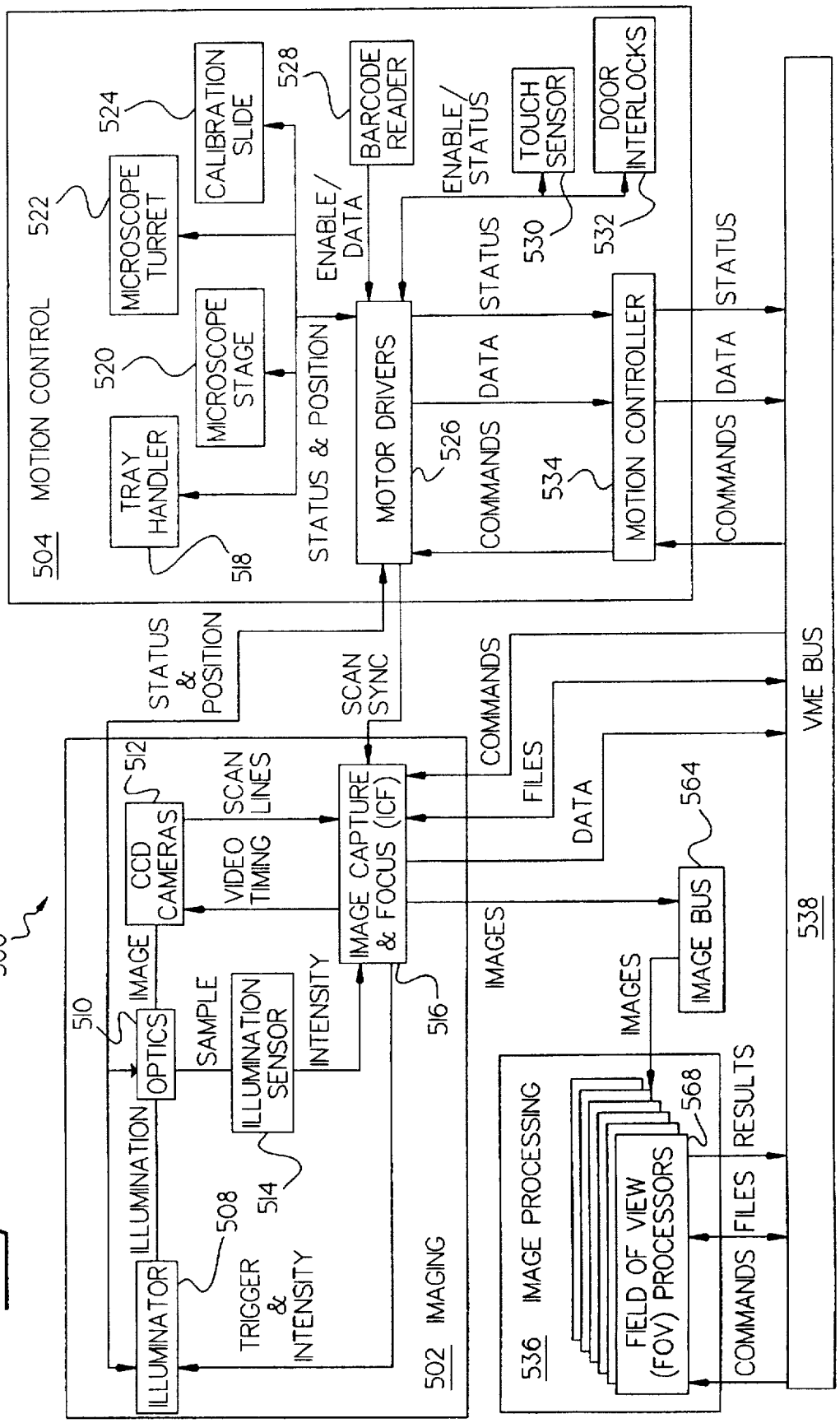
FIGS. 1A, 1B and 1C show an interactive biological specimen classification system of the invention.

In one preferred embodiment of the invention, the automated microscopy apparatus used is disclosed in a pending U.S. patent application entitled "Method for Identifying Normal Biological Specimens", as discussed herein.

In a presently preferred embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston et al., filed Feb. 18, 1992; U.S. patent application Ser. No. 07/838,065, now U.S. Pat. No. 5,361,140 entitled "Method and Apparatus for Dynamic Correction of Microscopic Image Signals" by Jon W. Hayenga et al., filed Feb. 18, 1992; and U.S. patent application Ser. No. 08/302,355, filed Sep. 7, 1994 entitled "Method and Apparatus for Rapid Capture of Focused Microscopic Images" to Hayenga et al., which is a continuation-in-part of application Ser. No. 07/838,063 filed on Feb. 18, 1992 the disclosures of which are incorporated herein, in their entirety, by the foregoing references thereto.

In one embodiment, the present invention is also related to biological and cytological systems as described in the following patent applications which are assigned to the same assignee as the present invention, filed on Sep. 20, 1994 (unless otherwise noted), and which are all hereby incorporated by reference including U.S. patent application Ser. No. 08/309,118 to Kuan et al. entitled, "Field Prioritization Apparatus and Method," U.S. patent application Ser. No. 08/309,061 to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/098,115 to Lee et al. entitled "Biological Analysis System Self Calibration Apparatus," U.S. patent application Ser. No. 08/308,992 to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931 to Lee et al. entitled "Cytological Slide Scoring Apparatus," U.S. patent application Ser. No. 08/309,148 to Lee et al. entitled "Method and Apparatus for Image Plane Modulation Pattern Recognition", U.S. patent application Ser. No. 08/309,250 to Lee et al. entitled "Apparatus for the Identification of Free-Lying Cells," U.S. patent application Ser. No. 08/309,117 to Wilhelm et al., entitled "Method and Apparatus for Detection of Unsuitable Conditions for Automated Cytology Scoring."

Figure 1B:
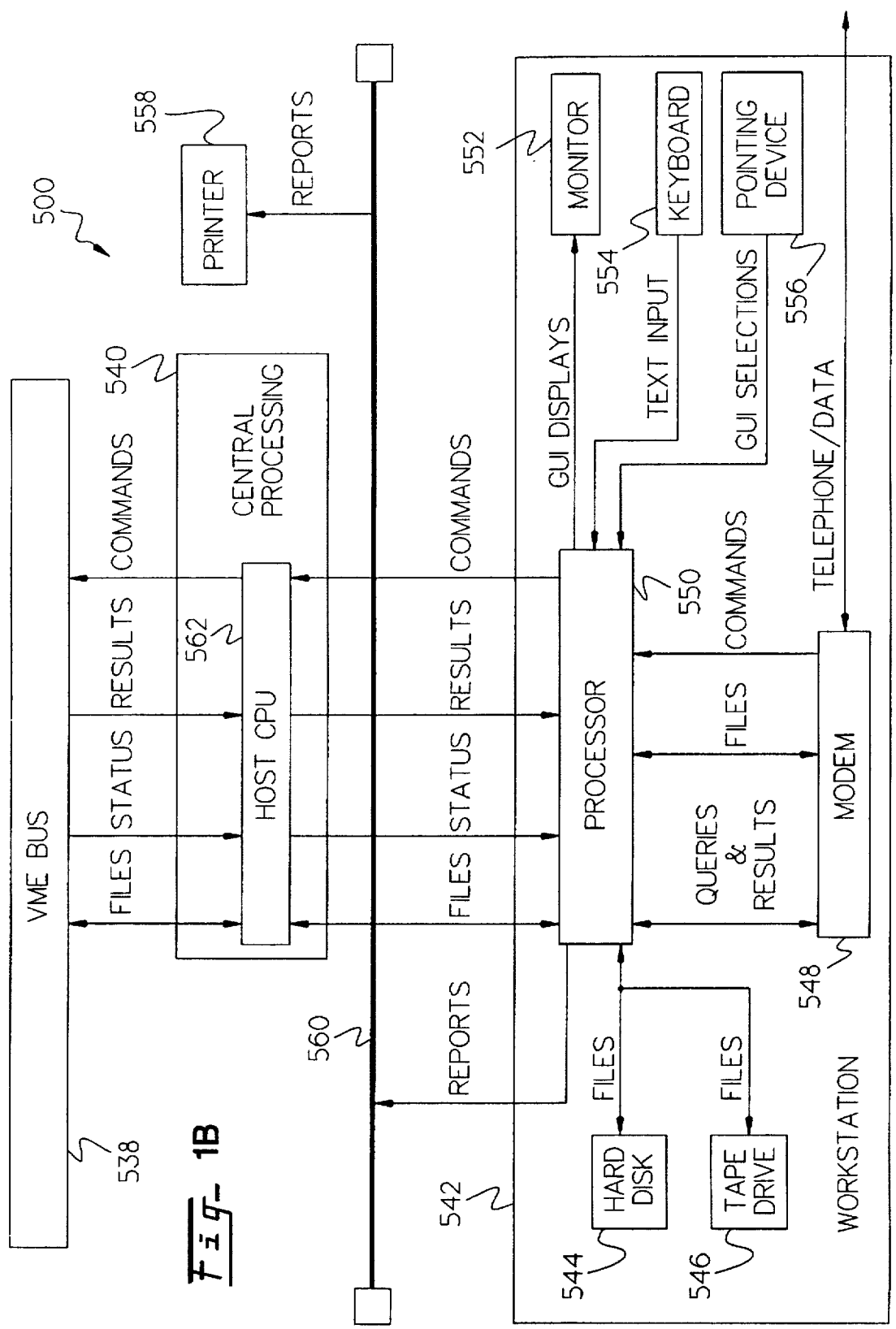
Figure 1C:
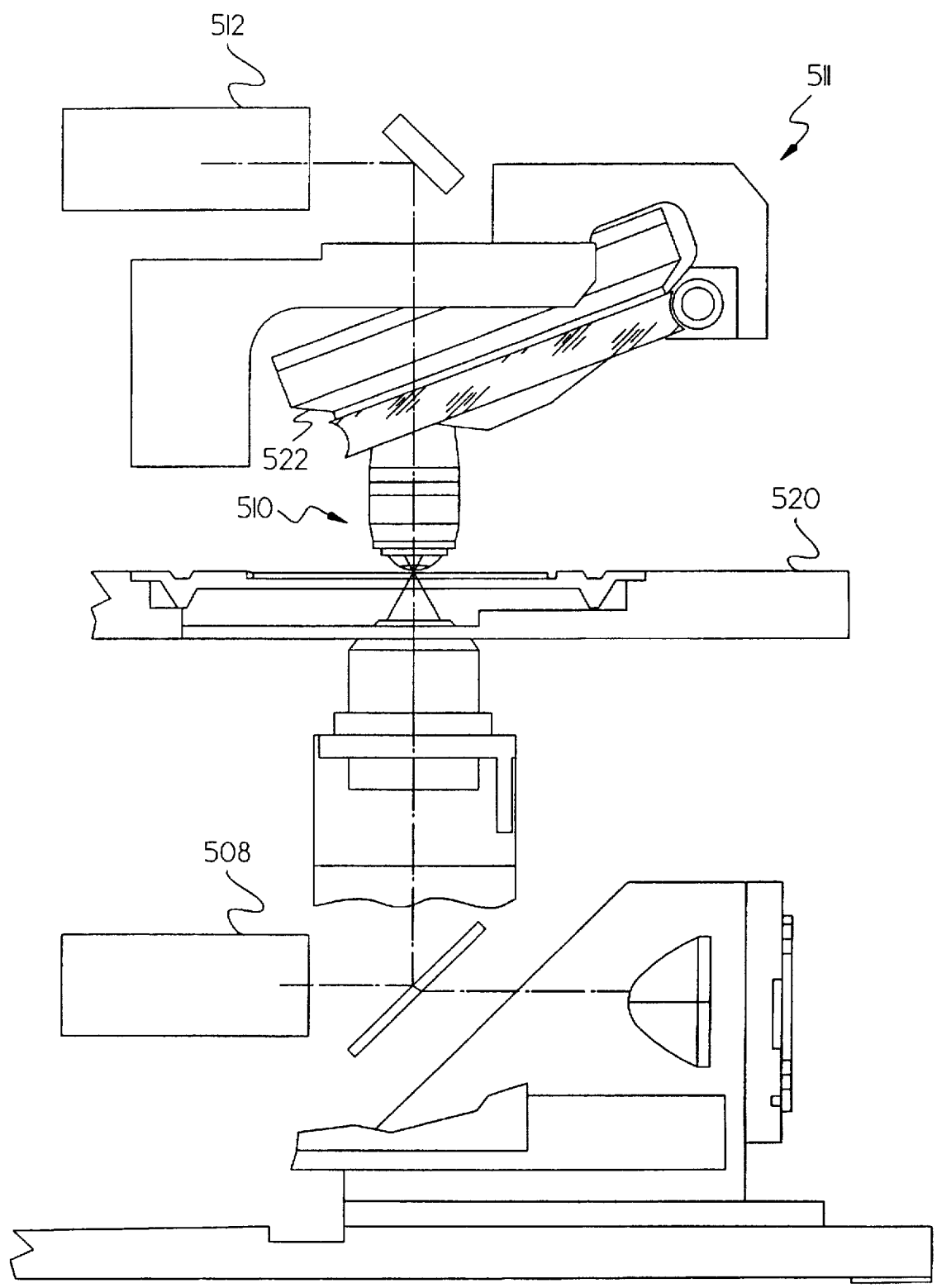

Now refer to FIGS. 1A, 1B and 1C which show a schematic diagram of one embodiment of the apparatus of the invention for image enhancement for biological specimens 500. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In some embodiments optics 510 may comprise color filters. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a workstation. A tape drive 546 is connected to the workstation 550 as well as a modem 548, a monitor 552, a keyboard 554, and a mouse pointing device 556. A printer 558 is connected to the ethernet 560.

During slide classification, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

It is to be understood that the various processes described herein may be implemented in software suitable for running on a digital processor. The software may be embedded, for example, in the central processor 540.

Figure 1D:
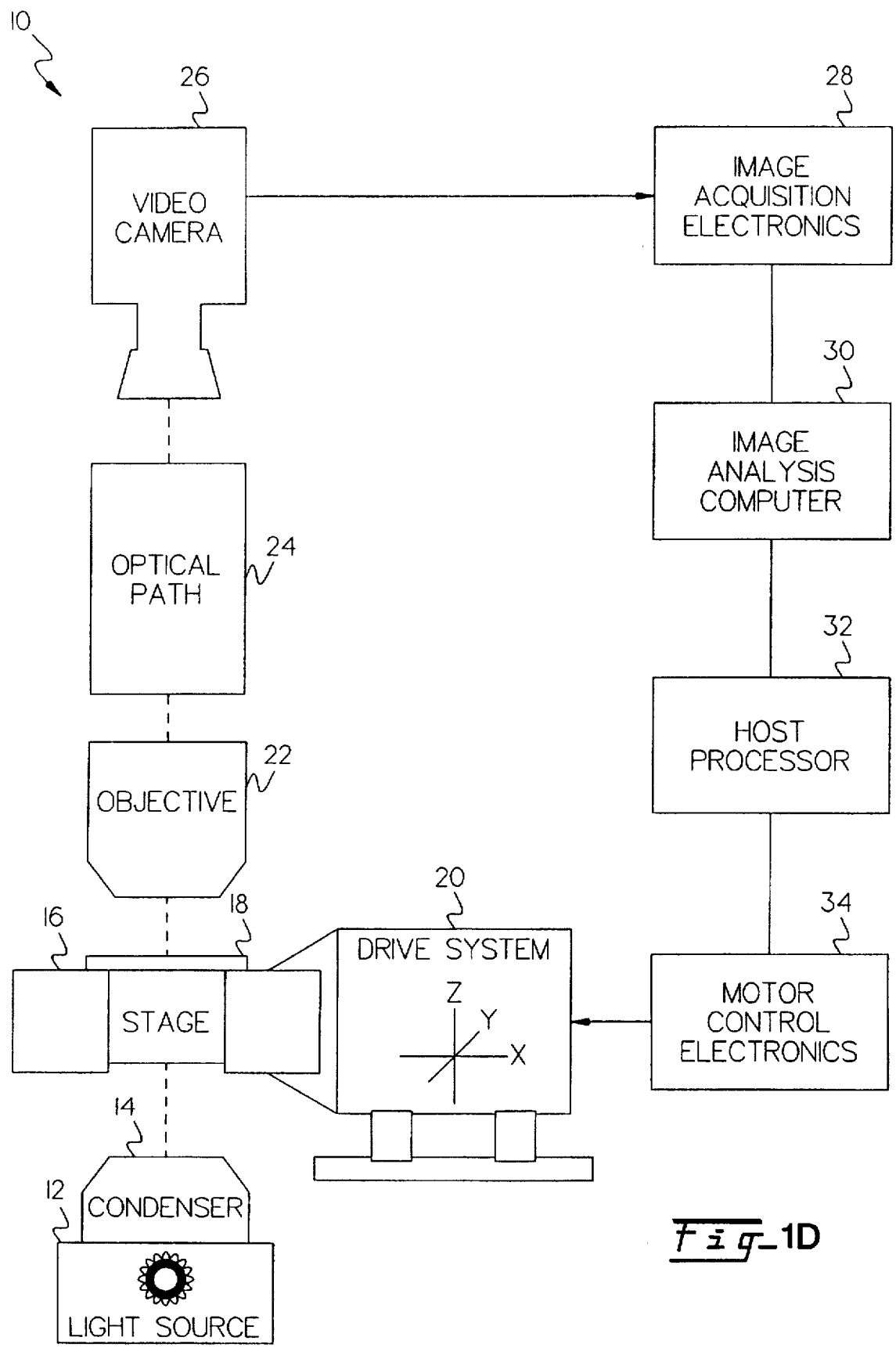
FIG. 1D shows one example of an image enhancement imaging apparatus of the invention.

Refer now to FIG. 1D which shows one example of an image enhancement imaging apparatus of the invention for an optical system. The imaging apparatus 10 includes optics 24 and objective 22. Drive system 20 is connected to stage 16. Stage 16 holds a slide 18 illuminated by light source 12 through condenser 14. The slide 18 may comprise, for example, a microscope slide containing a cytological specimen, such as a cervical smear. Objective 22 views test object on slide 18 and sends light rays through complex optics 24. Video camera 26, connected to image acquisition electronics 28, receives the light rays and converts them into electronic signals for processing by image analysis computer 30 connected to image acquisition electronics 28. Host processor 32 controls motor control electronics 34 which control the drive system 20.

Those skilled in the art will understand that, apart from processing of image signals performed by the image analysis computer 30 and host processor 32, the other elements of imaging apparatus 10 may comprise conventional devices.

For example, video camera 26 may comprise a standard CCD video camera that may be available, for example, from Sony Corporation of Japan. Host processor 32 and/or image analysis computer 30 may comprise a conventional microprocessor or other suitable programmable device capable of running software programs. The image enhancement method of the invention may be embodied, for example, in a software programming language, such as C language, or alternatively, be embedded into an integrated circuit, such as an application specific integrated circuit (ASIC) or any equivalent device capable of performing logic functions necessary for morphological processing of image signals such as erosion (minimum) and dilation (maximum) operations.

Figure 2:
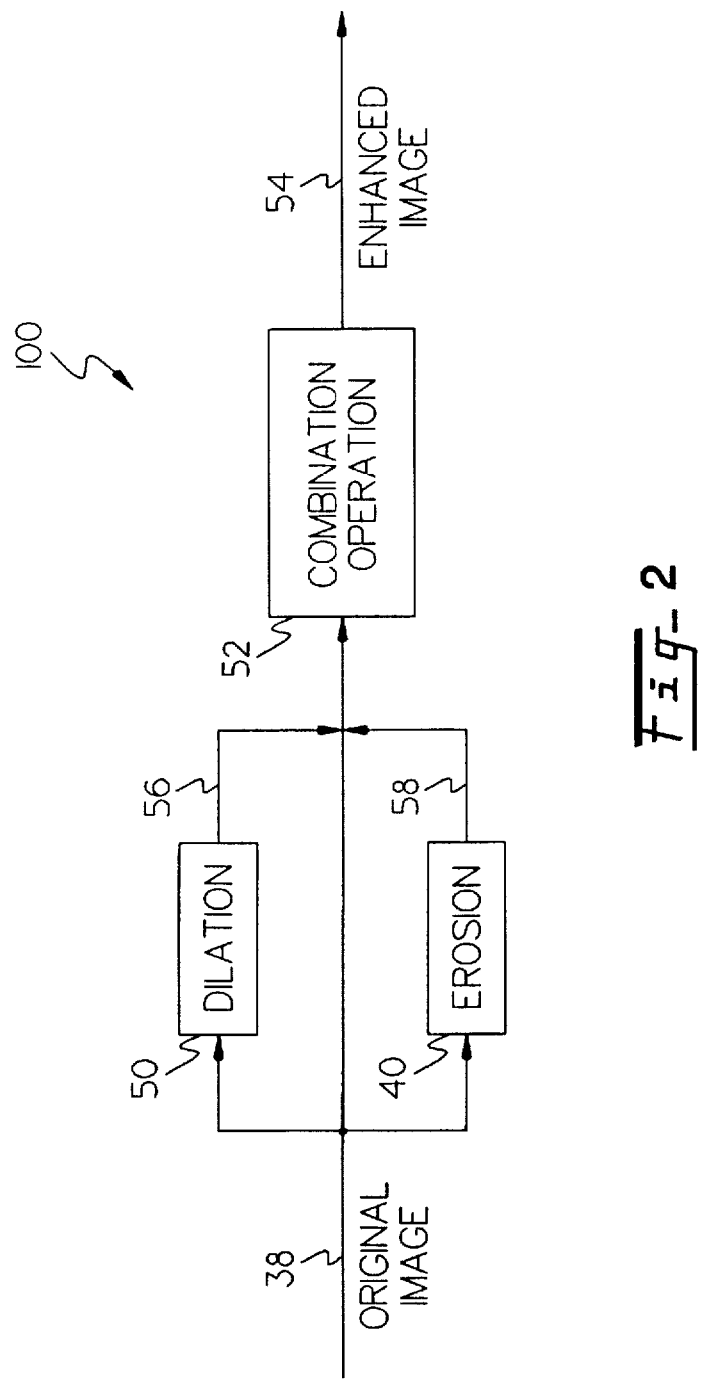
FIG. 2 is an illustrative block diagram showing one method of the invention to deblurr images.

Refer now to FIG. 2 which shows an illustrative block diagram showing one method of the invention to deblurr images. A representation in digital form of an original image 38 may be provided from image acquisition electronics 28 to the image analysis computer 30 wherein image enhancement apparatus 100 comprises a dilation operation 50, an erosion operation 40 and a combination operation 52. The combination operation 52 receives the original image 38, a dilated image 56 and an eroded image 58 and responsively produces an enhanced image 54. The combination operation 52 may be described in terms of a nonlinear fuzzy operation (1).

$$I_{enh} = \mu_D I_D + \mu_E I_E + \mu_O I_O \tag{1}$$

where $I_O$, $I_E$, $I_D$, and $I_{enh}$ comprise original, eroded, dilated and enhanced pixel values respectively. In addition $\mu_O$, $\mu_E$ and $\mu_D$ comprise membership values for the original, eroded, and dilated images that may be determined for each pixel as functions of the pixel values of the images. The membership values satisfy the following condition (2).

$$\mu_O + \mu_E + \mu_D = 1 \tag{2}$$

In a preferred embodiment of implementation, the membership value may be calculated by the following method. Let $$t = \frac{2I_O - I_D - I_E}{I_D - I_E}, \quad -1 \leq t \leq 1, \text{ and } t = 0 \text{ when } I_D = I_E \tag{3}$$

then the membership is $$\mu_D = \begin{cases} f(t); & t > 0 \\ 0; \text{otherwise}, \end{cases} \quad \mu_E = \begin{cases} f(-t); & t < 0 \\ 0; \text{otherwise}, \end{cases} \quad \mu_O = 1 - \mu_E - \mu_D \tag{4}$$

where f(t) is monotonic increasing function, $0 \leq f(t) \leq 1$. For computational efficiency, f(t) can be implemented by a lookup table.

Figure 3:
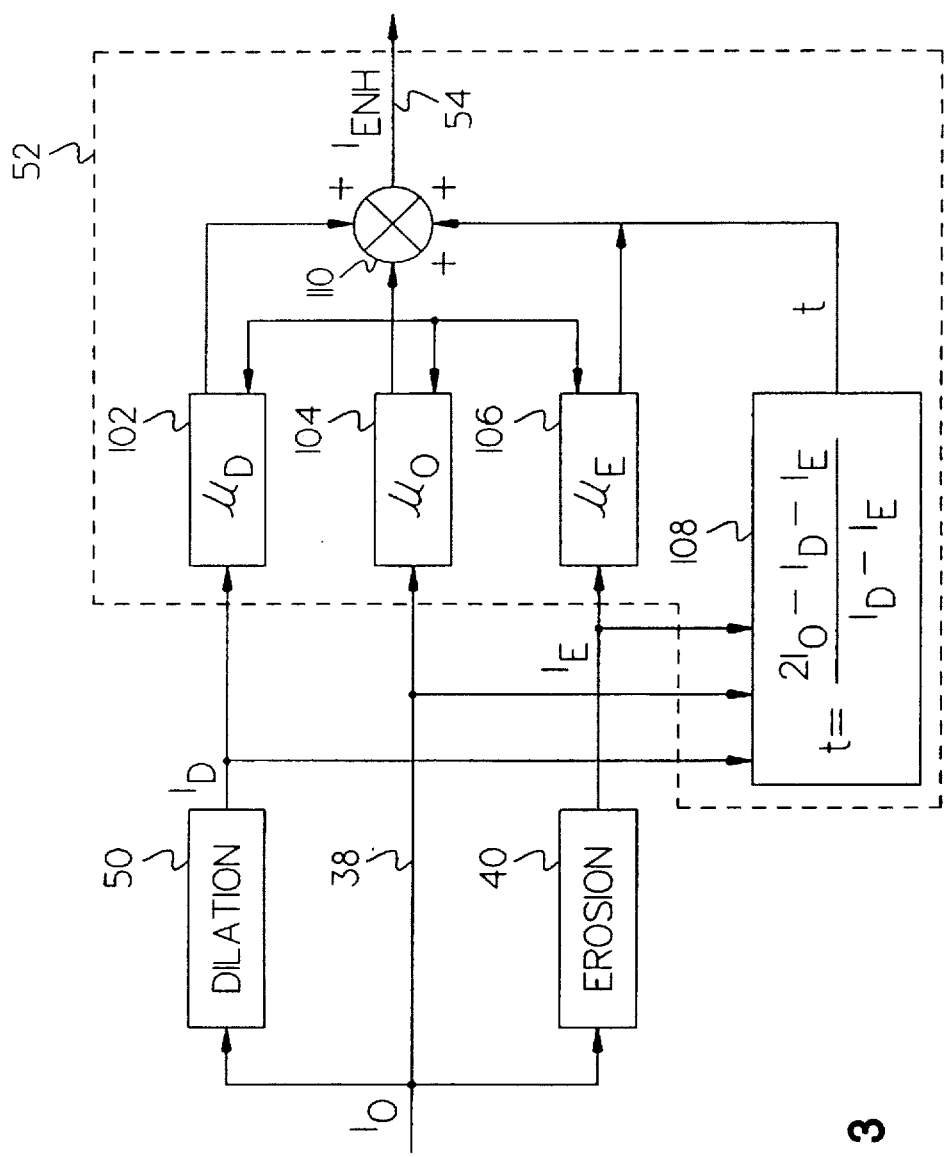
FIG. 3 is a functional block diagram of one embodiment of the method of the invention for enhancing an image.

Refer now to FIG. 3 which shows a functional block diagram of one embodiment of the method of the invention for enhancing an image. The operation 52 comprises membership values 102, 104 and 106 and functional block 108 wherein relationship (3) is performed on the original image, enhanced image and dilated image. The dilated, original and eroded images which are multiplied by their membership values are summed at summing junction 110 so as to produce an enhanced image 54.

Figure 4:
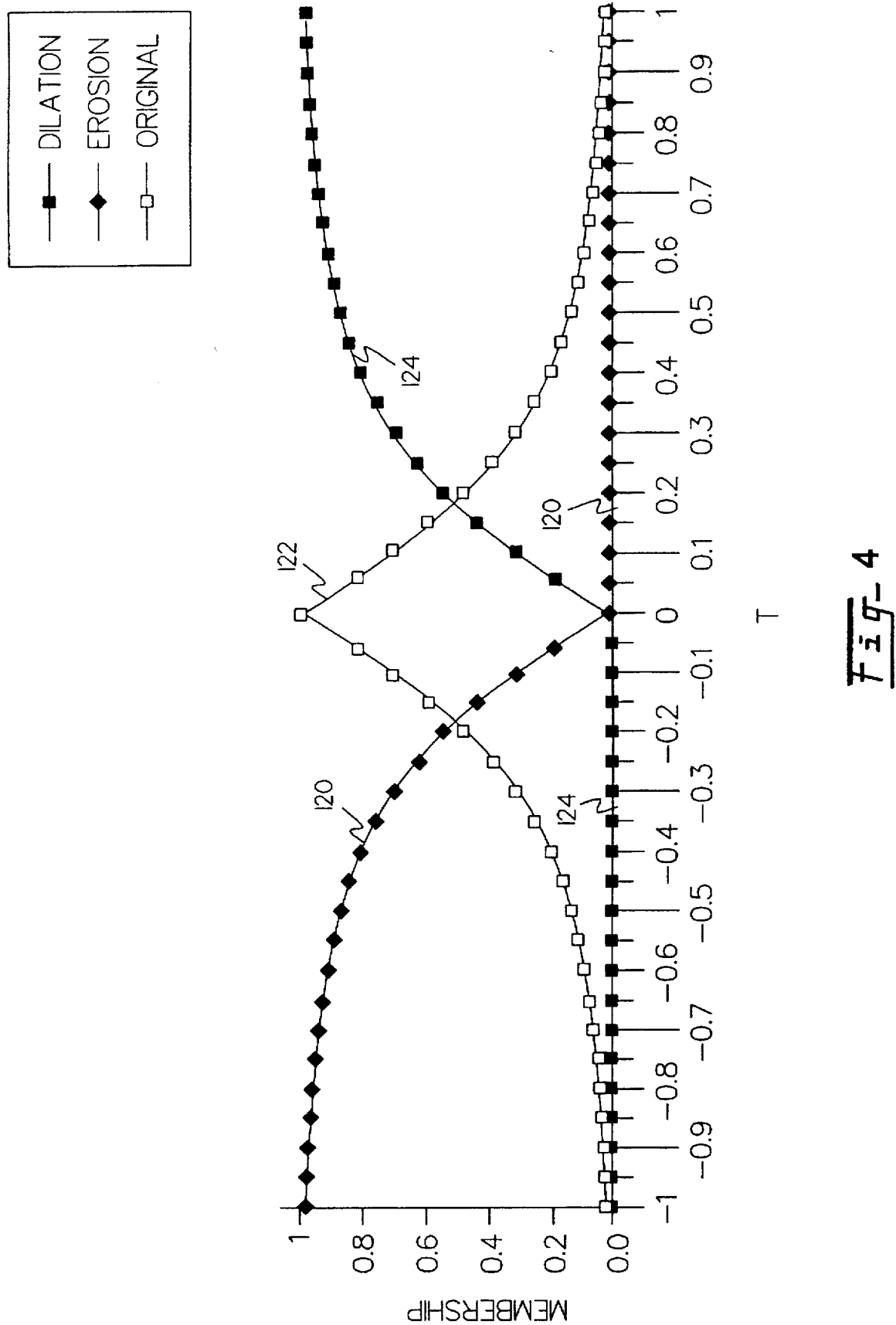
FIG. 4 shows an example of membership values for dilation, original and erosion images expressed as a function of t.

Refer now to FIG. 4 which shows an example of membership values for dilation, original and erosion images expressed as a function of t. Curve 120 comprises a plot of erosion membership $\mu_E$ as a function of t. Curve 122 comprises a plot of original membership $\mu_O$ as a function of t. Curve 124 comprises a plot of dilation membership $\mu_O$ as a function of t. From the above membership functions, if the pixel values of dilation, original and erosion are 200, 170 and 100 respectively, then the t value is 0.4 and the membership value of the dilation, original and erosion images are 0.8, 0.2 and 0 respectively. From functional block 108, the pixel value of the enhanced images is 200×0.8+170×0.2= 194. As we see in the example, if $I_D - I_O > I_O - I_E$, then $I_D - I_{enh} > I_D - I_O$, also if $I_D - I_O < I_O - I_E$, then $I_O - I_E > I_{enh} - I_E$. Thus, the above-described method of the invention provides a sharper edge than may be present in original images. If the original image has a very sharp edge, the result of this procedure provides an enhanced image almost identical to the original image. In a preferred embodiment, the method of the invention requires that original images exhibit high boundary contrast to produce an enhanced image.

Figure 5:
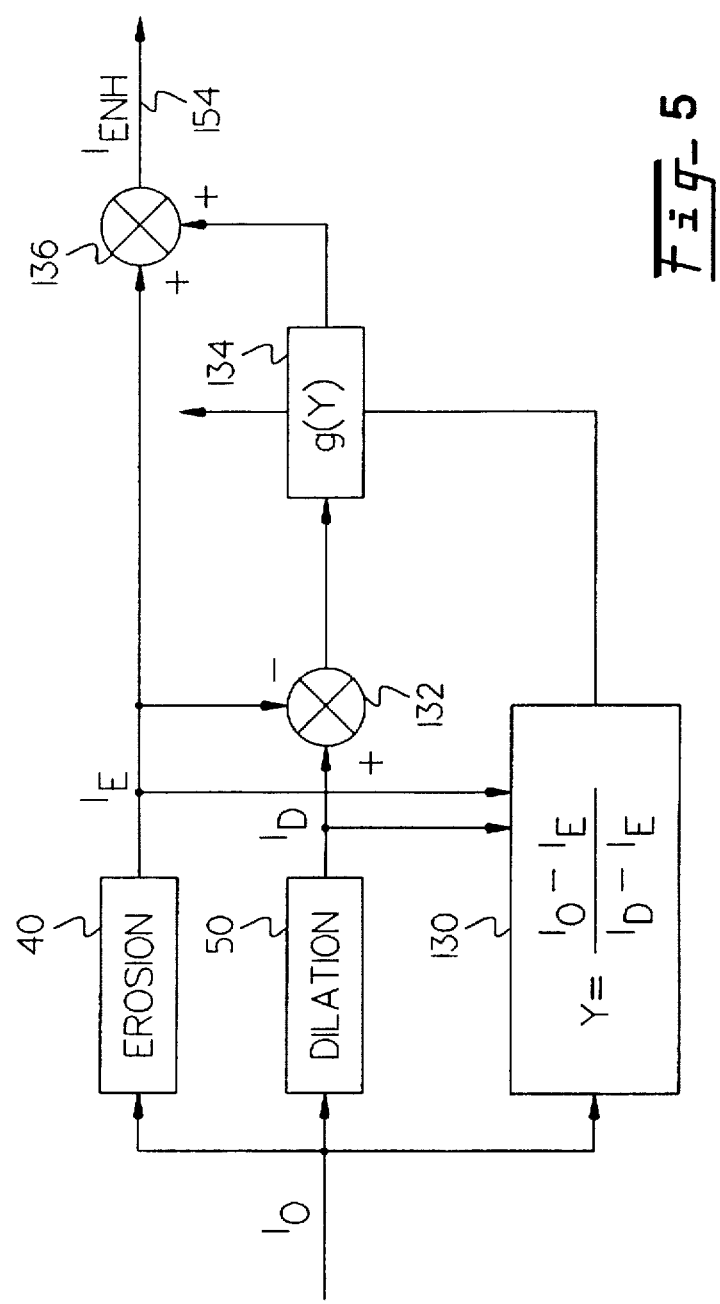
FIG. 5 shows a functional block diagram of an alternative embodiment of an image enhancement method of the invention.

Refer now to FIG. 5 which shows a functional block diagram of an alternative embodiment of an image enhancement method of the invention. The alternative embodiment image enhancement method comprises the erosion operation 40, the dilation operation 50, a first functional operation 130, a second functional operation 134 and summing operators 132 and 136. The alternative embodiment is arranged to implement relationship 5 and relationship 6 as described below.

Figure 6:
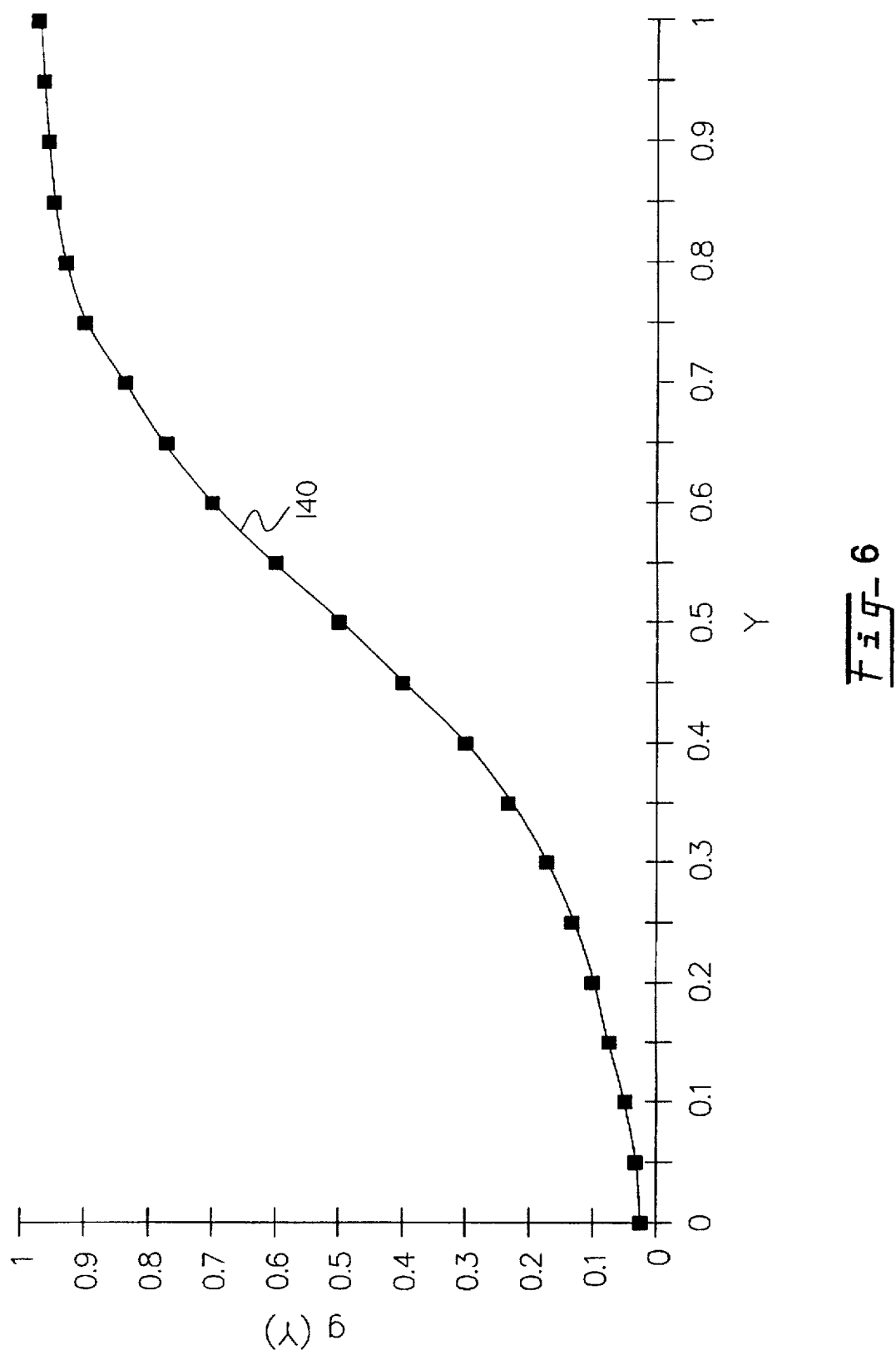
FIG. 6 shows graphically the functional relationship between g(y) and y for one example embodiment of the method of the invention.

Refer now jointly to FIG. 5 and FIG. 6 which show graphically the functional relationship between g(y) and y for one example embodiment of the method of the invention. Curve 140 is a plot of one example of g(y) as a function of y.

$$y = \frac{I_O - I_E}{I_D - I_E} \tag{5}$$

and y can be any value between 0 and 1 when $I_D = I_E$

By equation (2), the sum of membership is 1, so the enhanced image is $$I_{enh} = I_E + (\mu_D + \mu_O y)(I_D - I_E) = I_E + g(y)(I_D - I_E) \tag{6}$$

where g(y) is monotonic increasing function, $0 \leq g(y) \leq 1$. For computational efficiency, g(y) can be implemented by a lookup table.

Figure 7:
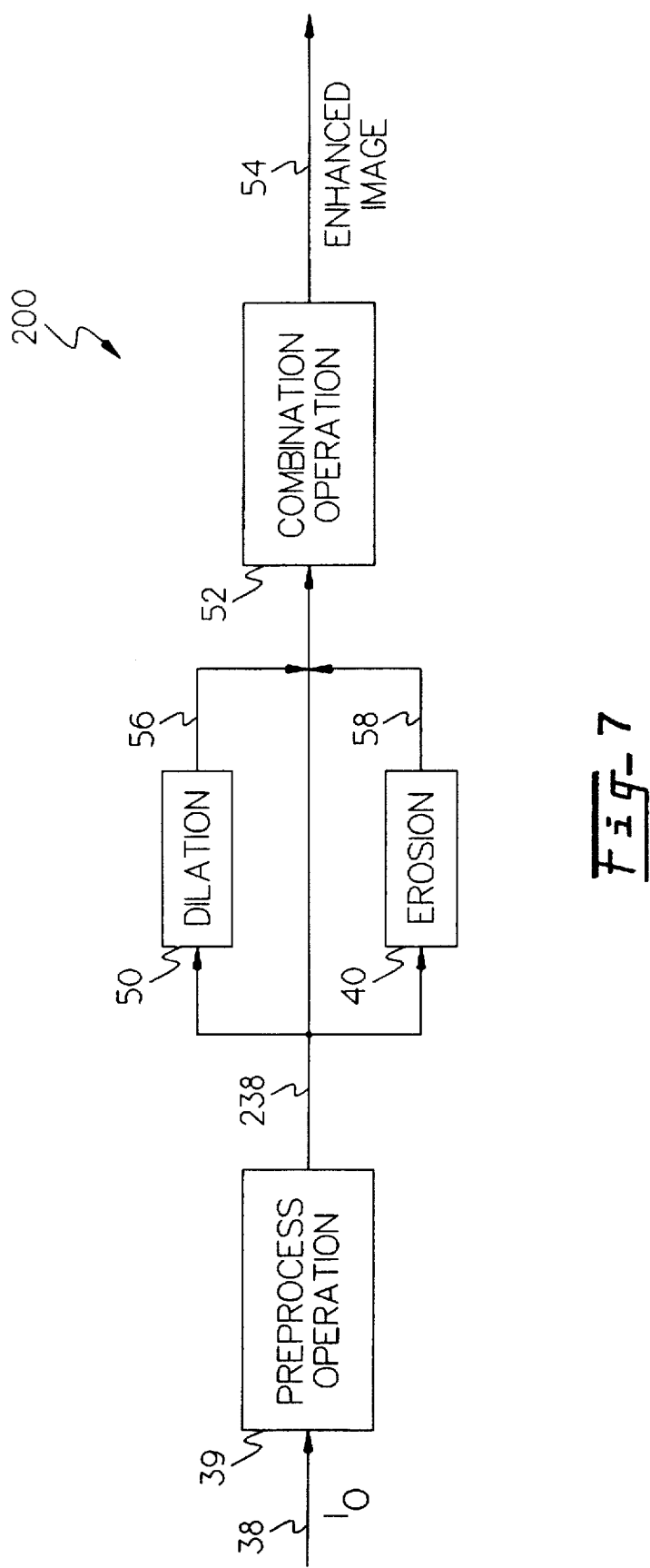
FIG. 7 shows a block diagram of an alternative embodiment of the invention.

Refer now to FIG. 7 which shows a block diagram of an alternative embodiment of the invention. In the alternative embodiment of the invention 200, the original image 38 is processed by preprocess operation 39 before a preprocessed image 238 is provided to dilation operation 50 and erosion operation 40 as well as combination operation 52. Preprocessing of the original image may be desirable if the original image contains noise. Preprocessing may comprise well known image processing methods such as applying a linear filter, a noise reduction filter, a low pass filter, a moving average, or a median filter.

When implementing the embodiment of FIG. 7, equations (1)–(6) are applied to the preprocessed pixel images. Hence equations (1) through (3) become $$I_{enh} = \mu_D I_D + \mu_E I_E + \mu_P I_P \tag{7}$$

$$\mu_P + \mu_E + \mu_D = 1 \tag{8}$$

and $$t = \frac{2I_P - I_D - I_E}{I_D - I_E}. \tag{9}$$

Equation (4) is now applied to the just described equations. Also, equation (5) becomes $$y = \frac{I_P - I_E}{I_D - I_E} \quad (10)$$

and equation (6) is applied to this value of y.

Figure 8:
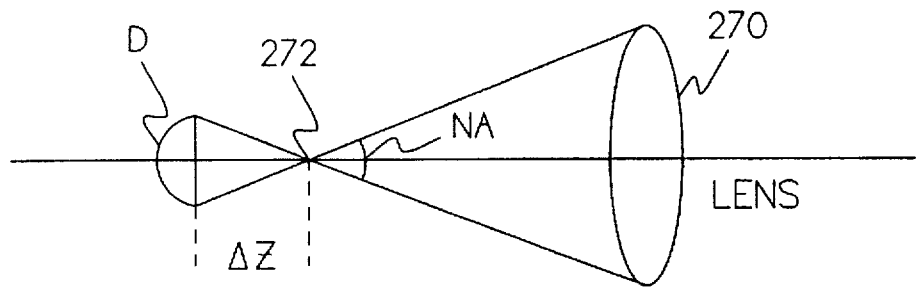
FIG. 8 schematically shows the blurred diameter of an optical system for one example embodiment of the invention.
Figure 9:
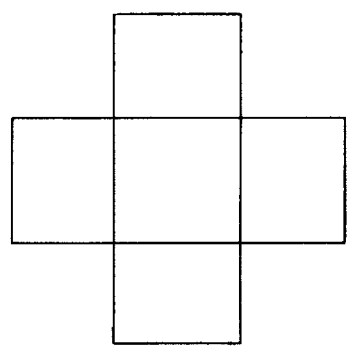
FIG. 9 shows one example of a 3 pixel by 3 pixel cross used for dilation and erosion in one embodiment of the present invention.

Refer now to FIG. 8 which schematically shows the blurred diameter of an optical system for one example embodiment of the invention. A lens 270 focuses on a focal point 272 to produce blurred diameter D at a plane off the focal point 272. The blurred diameter is approximately equal to twice the angle N.A. multiplied by delta Z which is the distance between the focal point 272 and the focal plane at the blurred diameter D. If delta Z is about 1 micrometer, and N.A. is 0.6, then D will be about 1.2 micrometers. Using a conventional CCD imaging system 1.2 micrometers may comprise about 2 pixels when the magnification is 20 times. As a result, a kernel size used for dilation and erosion may be advantageously set at about 3 pixels. FIG. 9 shows one example of a 3 pixel by 3 pixel cross used for dilation and erosion in one embodiment of the present invention. Dilation and erosion operations may be carried out in a well known manner.

Figure 10:
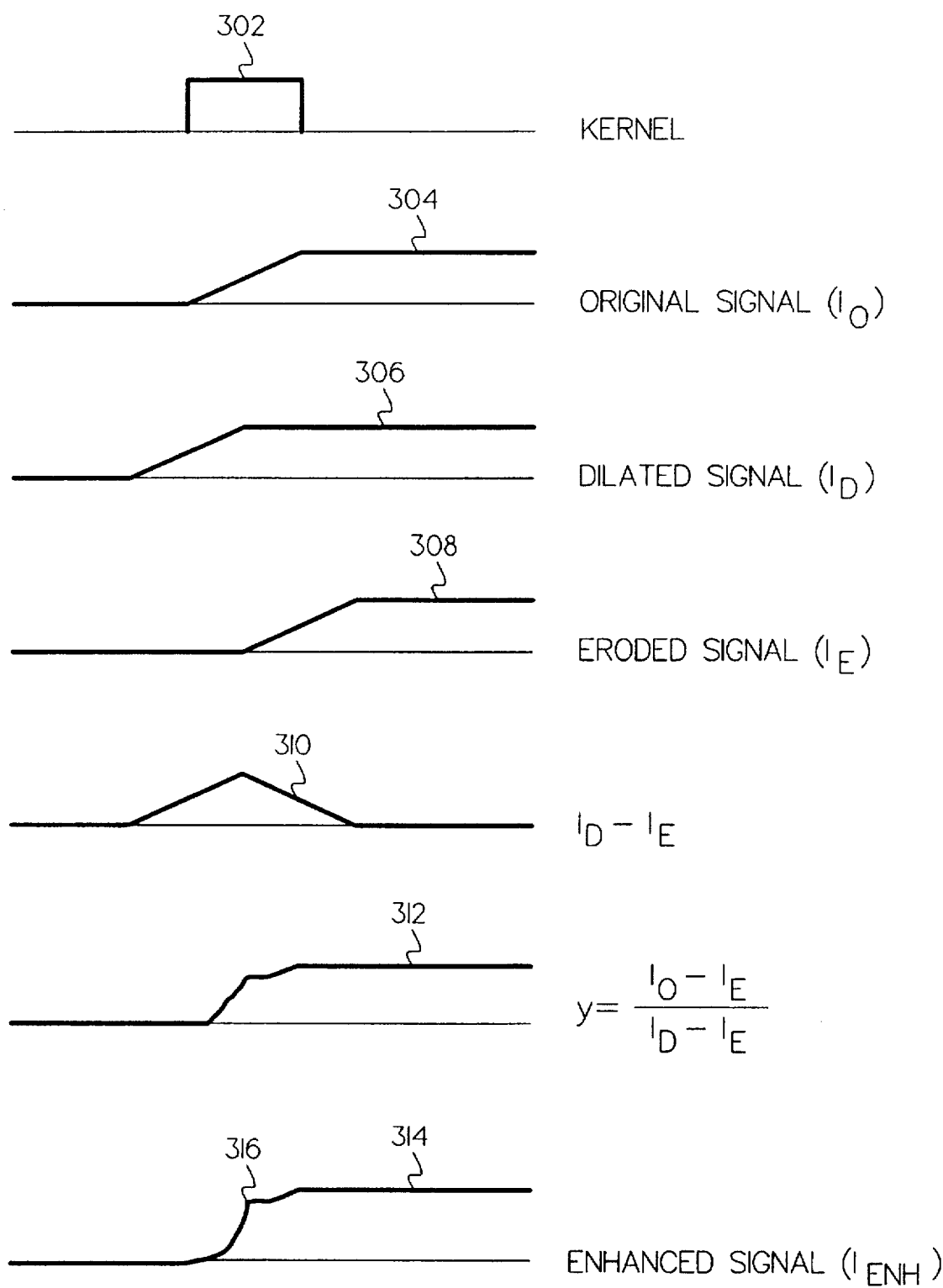
FIG. 10 graphically shows a relationship of a kernel, an original signal, a dilated signal, a value of y, and an enhanced signal.

Refer now to FIG. 10 which graphically shows a relationship between a kernel 302, an original signal 304, a dilated signal 306, the value of y, and an enhanced signal 314. The different signal 310 may be expressed by the difference: $I_D - I_E$. The y function may be expressed as in relationship (11) below.

$$y = \frac{I_O - I_E}{I_D - I_E} \quad (11)$$

Note that the enhanced signal 314 has a much sharper edge definition 316 than either the original signal, the dilated signal or the eroded signal.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An image enhancement method for an optical system for a biological specimen screener comprising the steps of:
   (a) obtaining an original image of a biological specimen;
   (b) providing a digital representation comprising more than two pixel values wherein the digital representation is representative of said original image;
   (c) dilating said digital representation to produce a dilated image;
   (d) eroding said digital representation to provide an eroded image; and
   (e) processing said dilated image, said eroded image and said digital representation to produce an enhanced image according to $$I_{enh} = \mu_D I_D + \mu_E I_E + \mu_O I_O$$

where $I_O$ comprises an original image pixel value, $I_E$ comprises an eroded image pixel value, $I_D$ comprises a dilated image pixel value, and $I_{enh}$ comprises an enhanced image pixel value and wherein $\mu_O$, $\mu_E$ and $\mu_D$ comprise membership values for each pixel of the digital representation and are related according to $$\mu_D = \begin{cases} f(t); & t > 0 \\ 0; & \text{otherwise,} \end{cases}$$

$$\mu_E = \begin{cases} f(-t); & t < 0 \\ 0; & \text{otherwise,} \end{cases}$$

$$\mu_O = 1 - \mu_E - \mu_D$$

where f(t) is a predetermined monotonic increasing function and wherein $$t = \frac{2I_O - I_D - I_E}{I_D - I_E}$$

and t=0 when $I_D = I_E$.

2. The image enhancement method of claim 1 wherein the biological specimen is a cytological specimen.

3. The image enhancement method of claim 1 wherein $\mu_O$, $\mu_E$ and $\mu_D$ are related according to $$\mu_O + \mu_E + \mu_D = 1.$$

4. The image enhancement method of claim 1 further comprising the step of preprocessing the digital representation prior to the step of dilating the digital representation.

5. The image enhancement method of claim 4 wherein the step of preprocessing comprises passing the digital representation through a noise reduction filter.

6. The image enhancement method of claim 4 wherein the step of preprocessing further comprises passing the digital representation through a low pass filter.

7. The image enhancement method of claim 4 wherein the step of preprocessing further comprises passing the digital representation through a moving average filter.

8. The image enhancement method of claim 4 wherein the step of preprocessing further comprises passing the digital representation through a median filter.

9. The image enhancement method of claim 4 wherein the step of preprocessing further comprises passing the digital representation through a linear filter.

10. An image enhancement method for an optical system for a biological specimen screener comprising the steps of:
    (a) obtaining an original image of a biological specimen;
    (b) providing a digital representation comprising more than two pixel values wherein the digital representation is representative of said original image;
    (c) dilating said digital representation to produce a dilated image;
    (d) eroding said digital representation to provide an eroded image; and
    (e) processing said dilated image, said eroded image and said digital representation to produce an enhanced image according to $$I_{enh} = I_E + (\mu_D + \mu_O y)(I_D - I_E) = I_E + g(y)(I_D - I_E)$$

where $I_O$ comprises an original image pixel value, $I_E$ comprises an eroded image pixel value, $I_D$ comprises a dilated image pixel value, and $I_{enh}$ comprises an enhanced image pixel value and g(y) is a predetermined monotonic increasing function; and where $$y = \frac{I_O - I_E}{I_D - I_E}$$

and y can be any value between 0 and 1 when $I_D = I_E$.

11. An image enhancement method for use in a microscopy system for analyzing a biological specimen, the image enhancement method comprising the steps of:

(a) obtaining an original image of a portion of said biological specimen;

(b) providing a digital representation comprising more than two pixel values wherein the digital representation is representative of said original image;

(c) preprocessing said digital representation so as to produce a preprocessed image;

(d) dilating the preprocessed image to produce a dilated image;

(e) eroding said preprocessed image to provide an eroded image; and (f) processing the dilated image, eroded image and the preprocessed image to produce an enhanced image according to $$I_{enh} = \mu_D I_D + \mu_E I_E + \mu_P I_P$$

where $I_p$ comprises a preprocessed image pixel value, $I_E$ comprises an eroded image pixel value, $I_D$ comprises a dilated image pixel value, and $I_{enh}$ comprises an enhanced image pixel value, and wherein $\mu_p$, $\mu_E$ and $\mu_D$ comprise membership values for each pixel of the digital representation and are related according to $$\mu_D = \begin{cases} f(t); & t>0 \\ 0; & \text{otherwise,} \end{cases} \quad \mu_E = \begin{cases} f(-t); & t<0 \\ 0; & \text{otherwise,} \end{cases} \quad \mu_P = 1 - \mu_E - \mu_D$$

where f(t) is a predetermined monotonic increasing function, and wherein $$t = \frac{2I_P - I_D - I_E}{I_D - I_E}$$

and t=0 when $I_D = I_E$.

12. The image enhancement method of claim 1 wherein $\mu_p$, $\mu_E$ and $\mu_D$ are related according to:

$$\mu_P + \mu_E + \mu_D = 1.$$

13. The image enhancement method of claim 11 wherein the step of preprocessing further comprises passing the digital representation through a noise reduction filter.

14. The image enhancement method of claim 11 wherein the step of preprocessing further comprises passing the digital representation through a low pass filter.

15. The image enhancement method of claim 11 wherein the step of preprocessing further comprises passing the digital representation through a moving average filter.

16. The image enhancement method of claim 11 wherein the step of preprocessing further comprises passing the digital representation through a median filter.

17. The image enhancement method of claim 11 wherein the step of preprocessing further comprises passing the digital representation through a linear filter.

18. An image enhancement apparatus for a biological specimen screener comprising:

(a) camera means for obtaining an image of a biological specimen;

(b) means, coupled to the camera means, for providing a digital representation comprising more than two pixel values wherein the digital representation is representative of the image;

(c) dilation means, coupled to the camera means, for dilating the digital representation of the image to provide a dilated image;

(d) erosion means, coupled to the camera means, for eroding the digital representation of the image to provide an eroded image;

(e) lookup table means comprising values of f(t), where f(t) is a predetermined monotonic increasing function; and (f) processing means, coupled to the camera means, lookup table means, eroding means and dilating means, for processing the dilated image, eroded image and the digital representation of the image, so as to produce an enhanced image according to $$I_{enh} = \mu_D I_D + \mu_E I_E + \mu_O I_O$$

where $I_O$ comprises an original image pixel value, $I_E$ comprises an eroded image pixel value, $I_D$ comprises a dilated image pixel value, and $I_{enh}$ comprises an enhanced image pixel value and wherein $\mu_O$, $\mu_E$ and $\mu_D$ comprise membership values for each pixel of the digital representation and are related according to $$\mu_D = \begin{cases} f(t); & t>0 \\ 0; & \text{otherwise,} \end{cases} \quad \mu_E = \begin{cases} f(-t); & t<0 \\ 0; & \text{otherwise,} \end{cases} \quad \mu_O = 1 - \mu_E - \mu_D$$

where f(t) is a predetermined monotonic increasing function, and wherein $$t = \frac{2I_O - I_D - I_E}{I_D - I_E}$$

and t=0 when $I_D = I_E$.

19. The apparatus of claim 18 wherein the biological specimen is a cytological specimen.

20. The apparatus of claim 18 wherein $\mu_O$, $\mu_E$ and $\mu_D$ are related according to $$\mu_O + \mu_E + \mu_D = 1.$$

21. The apparatus of claim 18 further comprising means for preprocessing the digital representation of the image, the preprocessing means being coupled between the image obtaining means and the dilating means and the eroding means so as to provide a preprocessed image to the dilating means and the eroding means.

22. The apparatus of claim 21 wherein the preprocessing means comprises a noise reduction filter.

23. The apparatus of claim 21 wherein the preprocessing means comprises a low pass filter.

24. The apparatus of claim 21 wherein the preprocessing means comprises a moving average filter.

25. The apparatus of claim 21 wherein the preprocessing means comprises a median filter.

26. The apparatus of claim 21 wherein the preprocessing means comprises a linear filter.

27. An image enhancement apparatus for a biological specimen screener comprising:

(a) camera means for obtaining an image of a biological specimen;

(b) means, coupled to the image obtaining means, for providing a digital representation comprising more than two pixel values wherein the digital representation is representative of the image;

(c) dilation means, coupled to the image obtaining means, for dilating the digital representation of the image to produce a dilated image;

(d) erosion means, coupled to the image obtaining means, for eroding the digital representation of the image to provide an eroded image; and (e) means for processing the digital representation, the eroded image, the dilated image and the enhanced image according to $$I_{enh} = I_E + (\mu_D + \mu_O y)(I_D - I_E) = I_E + g(y)(I_D - I_E)$$

where $I_O$ comprises an original image pixel value, $I_E$ comprises an eroded image pixel value, $I_D$ comprises a dilated image pixel value, and $I_{enh}$ comprises an enhanced image pixel value and g(y) is a predetermined monotonic increasing function; and where $$y = \frac{I_O - I_E}{I_D - I_E}$$

and y can be any value between 0 and 1 when $I_D = I_E$.

* * * * *